No. 883,253.  
PATENTED MAR. 31, 1908.

M. C. STEESE.  
CASTING APPARATUS.  
APPLICATION FILED MAY 2, 1907.

WITNESSES:  
J. Herbert Bradley.  
Charles Bennett.

INVENTOR  
Marcus C. Steese  
by Chri

UNITED STATES PATENT OFFICE.

MARCUS C. STEESE, OF STEUBENVILLE, OHIO.

CASTING APPARATUS.

No. 883,253.  Specification of Letters Patent.  Patented March 31, 1908.

Application filed May 2, 1907. Serial No. 371,492.

*To all whom it may concern:*

Be it known that I, MARCUS CASSIDY STEESE, residing at Steubenville, in the county of Jefferson and State of Ohio, a citizen of the United States, have invented or discovered certain new and useful Improvements in Casting Apparatus, of which improvements the following is a specification.

The invention described herein relates to certain improvements in the construction of pig casting machines, and has for its object a construction whereby the links forming the endless chain can be readily and quickly renewed, as also the parts forming the connection between the links and the supporting wheels.

The invention is hereinafter more fully described and claimed.

Figure 1:
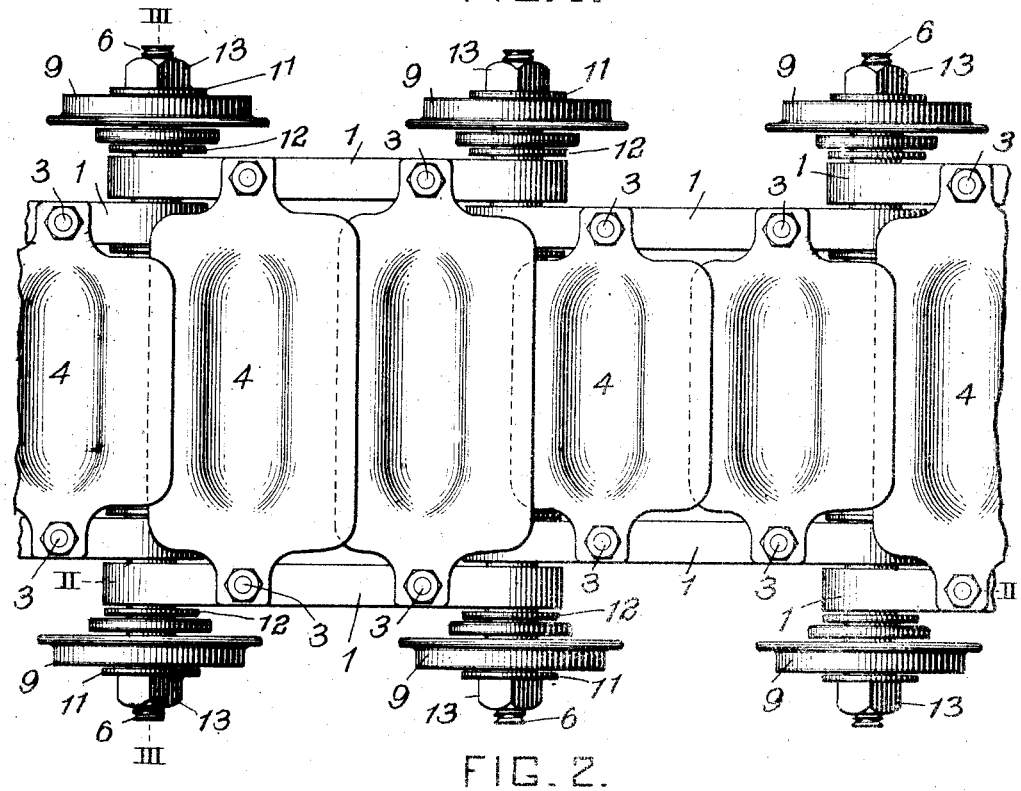
Figure 2:
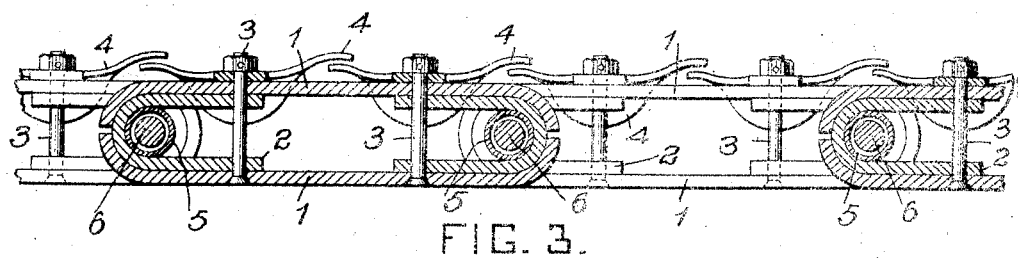
Figure 3:
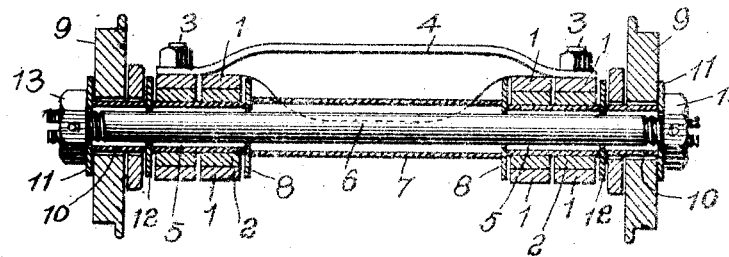

In the accompanying drawing, forming a part of this specification, Figure 1 is a top plan view of a portion of the endless chain having the casting pans secured thereon; Fig. 2 is a sectional view on a plane indicated by the line II—II Fig. 1; and Fig. 3 is a sectional view on a plane indicated by the line III—III Fig. 1.

In the practice of my invention each of the links consists of two members or bars 1 having their ends bent so that when placed in proper relation to each other a link will be formed, the bent portions forming the ends of the link. While not necessary, these bent portions may be made sufficiently long to bear against each other. These portions 1 fit around the closed end of U-shaped pieces 2, the legs of which extend along the sides of the link inside of the same. The links and U-shaped members or wearing pieces are held together by pins 3 pressing through said parts. It is preferred to employ these pins 3 for the purpose of securing the casting pans 4 to the links 1 as shown in Fig. 2. The U-shaped pieces 2 form bearings for the sleeves 5 surrounding the shaft 6, the sleeves being preferably of an internal diameter somewhat larger than that of the shaft. These sleeves are held a proper distance apart by means of intermediate sleeve 7 surrounding the middle portion of the shaft and between the sleeves 5 and 7 are interposed washers 8. By using these washers the sleeves 5 and 7 need not necessarily be of the same diameter and the washers prevent the links from moving inwardly. The wheels 9 are loosely mounted upon sleeves 10 interposed between washers 11 and 12, the latter being arranged between the sleeves 5 and 10 serving to hold the wheel in position. The wheel is held in position on the sleeves 10 by means of the washer 11 and nuts 13 screwing onto the threaded ends of the shaft and bearing against the washer 11. It is preferred to lock the nuts in position in any suitable manner.

The construction of link employed by me will permit of the ready renewal of the link or its connection or the supporting wheel in case of accident, it only being necessary to drive out the bolts 3 whereupon the members 1 can be removed, the U-shaped member 2 if necessary, and these parts replaced by new ones. The construction of axle permits the easy rotation of the wheel around the sleeve and in case of wear the easy and quick renewal of any of the parts. The parts most likely to be worn or injured are the sleeves 5 and 10, and in order to renew these sleeves, the nut 13 can be taken off from the end adjacent to the worn part and said part slipped off the shaft without disturbing other parts.

I claim herein as my invention:

1. A link for endless chains having in combination two side bars or legs having their ends bent inwardly, and two U-shaped pieces arranged between the side bars or legs.

2. The combination in a casting machine of links consisting of side bars or legs having their ends bent inwardly, U-shaped pieces arranged between said side bars or legs, casting pans arranged on the links and bolts for securing the parts of the link and casting pan in position.

3. In a casting machine, the combination of a shaft, sectional sleeves fitting loosely on said shaft, links bearing at their ends on two of the sleeves, wheels loosely mounted on two other sleeves, and means for holding the sleeves, links and wheels in position on the shaft.

4. In a casting machine, the combination of a shaft, an intermediate sleeve loosely mounted on the shaft, link sleeves arranged at the ends of the intermediate sleeve, links bearing on the latter sleeves, wheel sleeves arranged outside of the link sleeves, wheels loosely mounted on the wheel sleeves, washers interposed between the link and wheel sleeves and between the link and intermediate sleeves, and means engaging the shaft for holding the several parts in position on the shaft.

In testimony whereof, I have hereunto set my hand.

MARCUS C. STEESE.

Witnesses:
CHARLES BARNETT,
J. HERBERT BRADLEY.